Inventors
CHARLES W. EARP
FRANCIS G. OVERBURY
By Leonard Holtz
Agent

Inventors
CHARLES W. EARP
FRANCIS G. OVERBURY
By Leonard Holtz
Agent

Inventors
CHARLES W. EARP
FRANCIS G. OVERBURY
By Leonard Holtz
Agent

Inventors
CHARLES W. EARP
FRANCIS G. OVERBURY
By Leonard Holtz
Agent

Inventors
CHARLES W. EARP
FRANCIS G. OVERBURY
By Leonard Holtz
Agent 3,448,453

DOPPLER VOR SYSTEMS

Charles William Earp, Hampstead, London, and Francis Giles Overbury, Potters Bar, England, assignors to International Standard Corporation, New York, N.Y., a corporation of Delaware Filed June 29, 1967, Ser. No. 649,903
Claims priority, application Great Britain, July 8, 1966, 30,757/66
Int. Cl. G01s 1/44
U.S. Cl. 343—106 6 Claims

ABSTRACT OF THE DISCLOSURE

An improved Doppler VOR system wherein a separate aerial radiates a reference signal having a frequency equal to the gyration frequency of the system and wherein at least one harmonic of the reference signal is radiated by an array of aerials. The radiated harmonic is recovered at the receiver and is used to improve the accuracy of the reference signal received from the separate aerial.

*Field of the invention*

This invention relates to VOR radio beacons which have Doppler modulation.

*Brief description of prior art*

The practical ability of Doppler VOR beacons to suppress errors due to reflections from obstacles near the site is well known, but if the accuracy of the reference wave, usually transmitted as a simple amplitude modulation of the carrier wave, could be improved, then overall precision of a VOR system would be enhanced. One prior art system is disclosed in British Patent 1,041,777 issued to C. W. Earp on Dec. 29, 1966 which is discussed hereinbelow.

The main object of the present invention is to derive a harmonic reference wave from the radiation of Doppler VOR beacons and to modify beacons not having a suitable characteristic to radiate a harmonic reference wave in a manner which does not impair compatibility with existing receivers.

A further object of the invention is due to use the harmonic reference wave so produced to improve the accuracy of the fundamental reference wave, which is usually transmitted as a simple amplitude modulation of the carrier wave. The fundamental reference wave is normally the effective gyration frequency of 30 c.p.s. used for the aerial commutation.

*Summary of the invention*

According to the invention there is provided a Doppler VOR system which comprises a separate aerial arranged to radiate a reference frequency signal consisting of a predetermined frequency, an array of spaced aerials located for cooperation with said separate aerial and apparatus to cause signals to be radiated from the aerials in the array in sequence at the predetermined frequency, the signals being radiated from the array including at least one harmonic of the reference frequency.

The harmonic frequency is recovered at the receiver and used to correct the phase of the reference frequency.

In our British Patent 1,041,777 a system is described in which a fixed $n$th harmonic reference wave is extracted from the normal radiation of an alternating sideband Doppler VOR beacon, which uses an odd number $n$ of aerials in a circular ring, and the fixed harmonic reference is used to correct inaccuracy of the reference wave by a method such as will be directed later. The alternation of the sideband provides the modulation in this case.

This arrangement is limited to alternating sideband beacons in which the radiated gyrating energy, which produces the Doppler modulated signal at the receiver, comprises two signals which are respectively the upper and lower sidebands produced by modulation of the carrier energy by a subcarrier, usually 9960 c.p.s., the two signals being radiated from opposite sides of the ring of aerials. The effect is to provide frequency shift keying of the subcarrier frequency at the $n$th harmonic of the gyration frequency, where $n$ is the number of aerials.

In double sideband Doppler VOR beacons the two sideband signals are radiated from opposite sides of the ring simultaneously, and an arrangement is proposed in a first embodiment of the present invention whereby the double sideband signals are modulated by radiation alternately to produce a gyration frequency harmonic which may be recovered and used to correct the reference frequency.

Both the above-described methods of radiating an harmonic reference wave have the limitation that the harmonic produced is a function of the number of aerials of the beacon, and this limitation is avoided in further embodiments of the invention. These further embodiments are applicable to beacons with any number of aerials. In such embodiments two subcarrier sideband signals are modulated at the beacon with a frequency which is an harmonic of the gyration rate, the modulation being performed before the signals are connected to the commutating switch for connection to the aerial.

*Description of the preferred embodiments*

Figure 1:
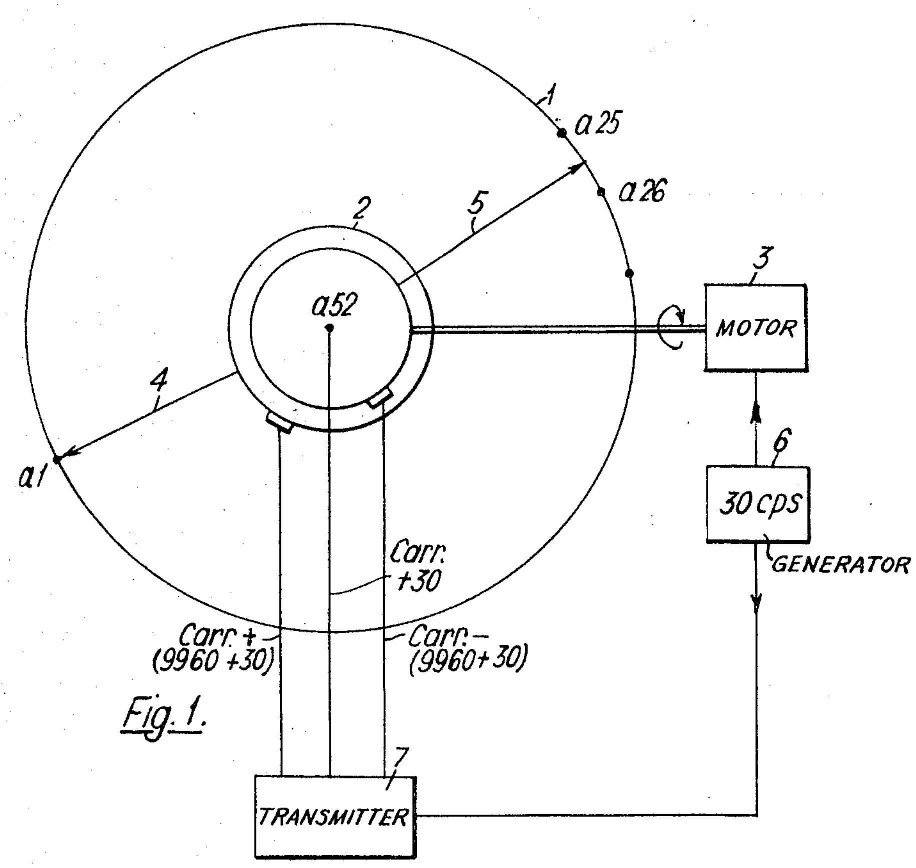
FIG. 1 shows a block circuit diagram of a beacon having an odd number of aerials.

Referring to FIG. 1 the beacon aerial array 1 consists of a central aerial *a*52 and a ring of aerials 2.5 wavelengths of the carrier frequency in diameter and consisting of 50 dipole aerials spaced 7.2° apart. The commutator switch 2 is rotated at a gyration frequency of 30 c.p.s. from a generator 6 by a motor 3 and has two distributors 4 and 5 set at an angle of 180° $1/(1-n)$ where $n$ is the number of aerials in the ring, the angle being 176.4° in this embodiment. In this way, one of the two sideband distributors will be midway between two aerials at the moment when the other distributor is coincident with an aerial. The distributors 4 and 5 and the central aerial *a*52 are connected to the respective outputs of a transmitter 7 which is a normal beacon transmitter supplying the carrier frequency amplitude modulated by the reference frequency (the 30 c.p.s. source) to the central aerial, and the upper and lower sidebands due to modulation of the beacon carrier frequency by 9960 c.p.s. subcarrier to the distributors. The subcarrier is also amplitude modulated by the gyration frequency of 30 c.p.s.

Hence, if pulses radiated by individual aerials are short enough, radiated sideband energy will tend to be switched alternately between upper and lower sideband frequencies, and extraction of a stable 50th harmonic reference frequency for correcting the phase of the inaccurate 30 c.p.s. reference frequency may be effected in a suitable receiver. The receiver may be of a type to be described later herein.

Such a system could be completely satisfactory, except that it would not be possible to achieve complete compatibility between normal double sideband beacons having an even number of aerials, and alternating sideband beacons having an odd number of aerials.

An embodiment which uses a modified beacon to radiate a signal which is compatible with existing VOR receivers but with which a special receiver may be used to achieve greater accuracy when required will now be described. In this embodiment, the effect of alternating flow of sideband energy is achieved by modulation of the two sidebands in phase opposition at a suitable harmonic frequency not necessarily directly related to the number of aerials used, and carried out before application to the sideband distributors of the ground station.

Figure 2:
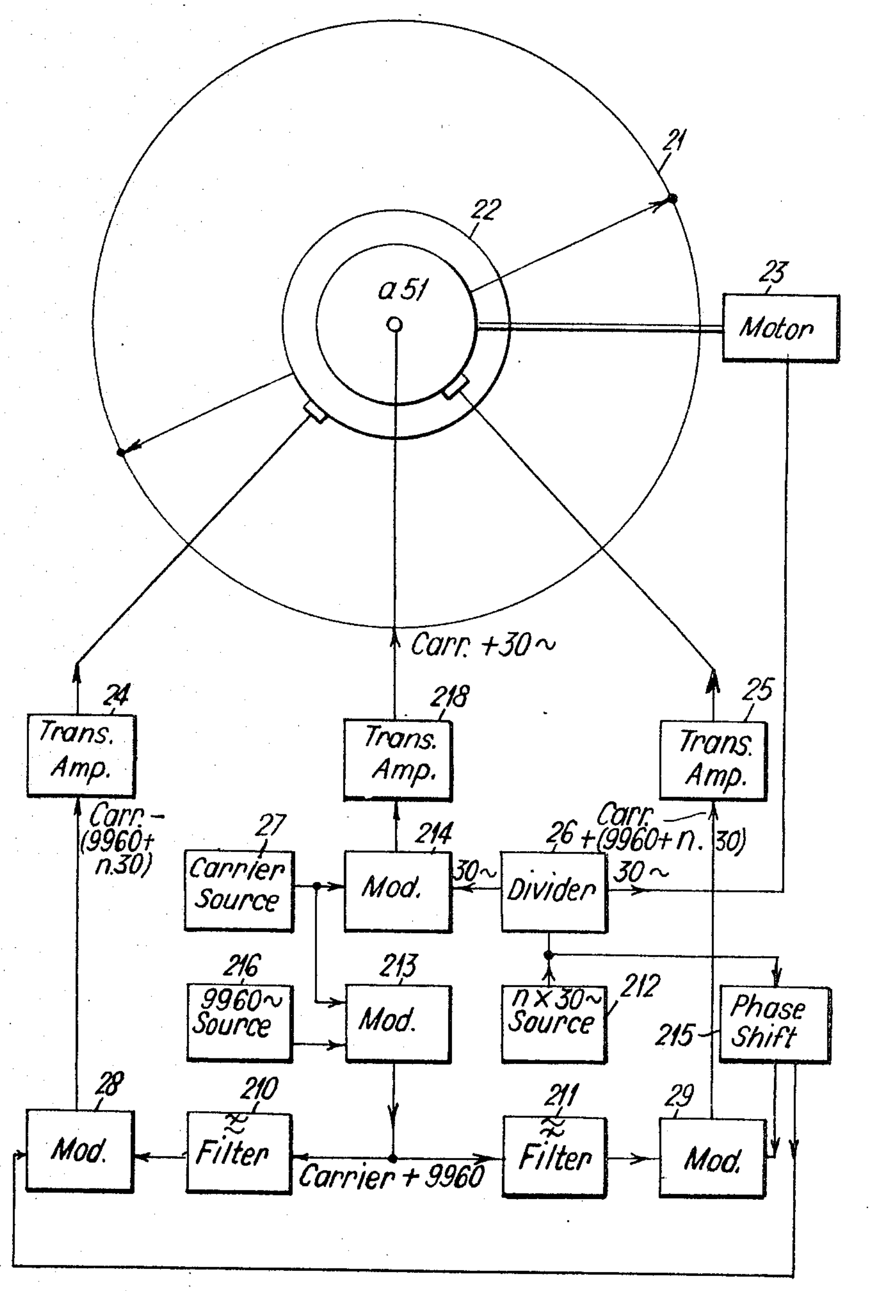
FIG. 2 shows a block circuit diagram of a beacon having any number of aerials.

Referring to FIG. 2, a VOR beacon has a ring of aerials 21 and a separate aerial *a*51 which is located at the center of the ring 21. The aerial *a*51 is connected to the output of transmit amplifier 218 and the ring of aerials 21 is connected to the output of transmit amplifiers 24 and 25 via a commutating switch 22. The commutating switch 22 is driven by a motor 23 having power supplied from a dividing circuit 26. A source of energy 212, the frequency of which is an harmonic of the gyration frequency, has its output connected to the input of the dividing circuit 26 and also to a phase shift circuit 215. The output of the dividing circuit is connected both to the motor 23 and to a first input of a modulator 214. The second input of modulator 214 is connected to the output of a source of beacon carrier frequency 27 and the output of the modulator is connected to the input of transmit amplifier 218.

A source of frequency 216, having a frequency of 9960 c.p.s. in this embodiment, is connected to the first input of a further modulator 213 which also has a second input connected to the output of the carrier frequency source 27, and an output connected to the respective inputs of two filters 210 and 211. The respective outputs of filters 210 and 211 are connected to the first inputs respectively of two amplitude modulators 28 and 29. The respective second inputs of these modulators are connected to the outputs of the phase shift circuit 215, and the respective outputs of these modulators are connected to the respective inputs of transmit amplifiers 24 and 25.

The beacon is a modification of a Doppler VOR beacon in which the 30 c.p.s. gyration and reference frequencies are obtained by division from a higher frequency (source 212). The reference frequency is modulated on to the beacon carrier frequency by modulator 214 and after amplification in transmit amplifier 218 is radiated by antenna *a*51. The beacon carrier frequency is also modulated by modulator 213 with an IF frequency from source 216, 9960 c.p.s. in this case, the upper sideband being selected by filter 211 and the lower sideband being selected by filter 210. In a normal VOR beacon, these subcarrier sidebands are radiated, but in the modified beacon according to the invention the subcarrier sidebands are each amplitude modulated in the amplitude modulators 28 and 29 by the harmonic source 212, phase-shifted in the phase shift circuit 215, the respective harmonic inputs to the modulators being phase 180° with respect to each other. The two subcarrier sideband signals, each spaced 9960 c.p.s. from the carrier frequency of the beacon and amplitude modulated in antiphase at a harmonic of the gyration frequency, are amplified and radiated from opposite sides of the ring of aerials and modulated in Doppler fashion by gyration around the ring.

Since the harmonic of the gyration frequency (the 23rd in this case) is amplitude modulated in antiphase on the radiated signal it appears at the receiver as a frequency shift of the 9960 c.p.s. frequency.

Figure 4:
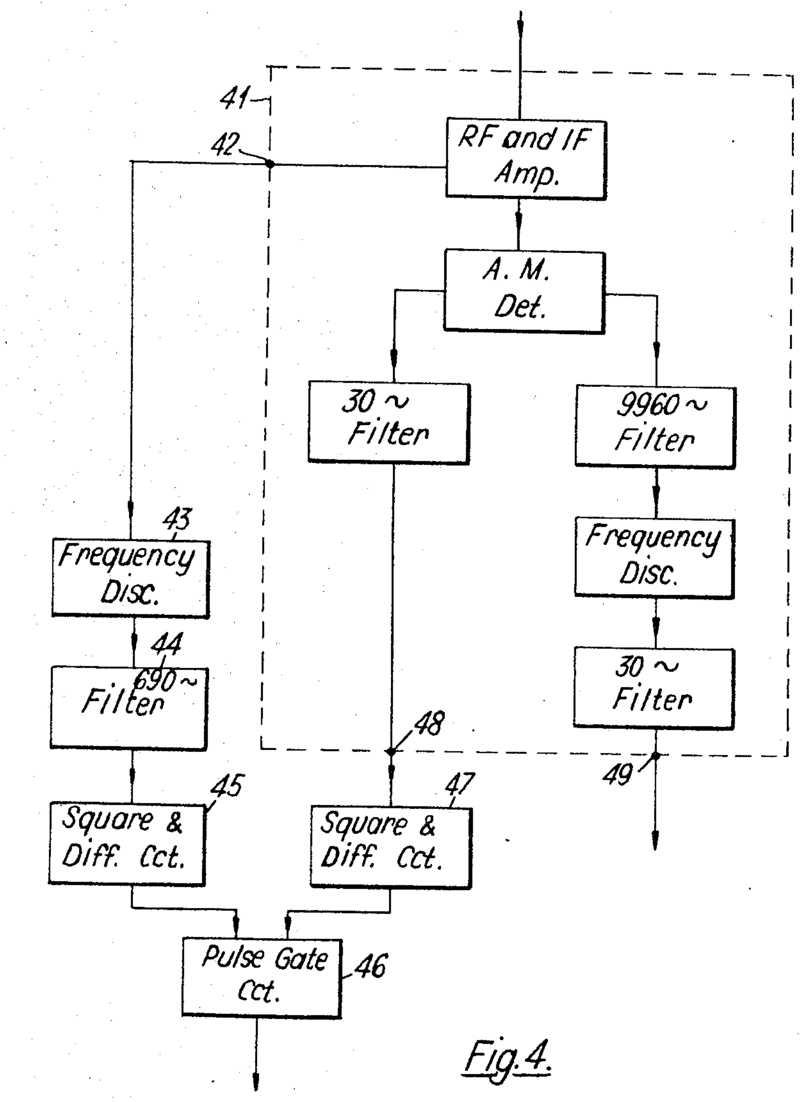
FIG. 4 shows a block circuit diagram of a receiver for use with the beacon shown in either FIG. 1 or FIG. 2.

The receiver for the signal radiated from the beacon of FIG. 2 is shown in FIG. 4. The circuit within the block 41 is a normal VOR receiver giving two outputs, namely, the variable range signal and the reference signal, but having in addition an IF output 42. The IF output 42 is connected to a frequency discriminator 43 which has an output connected to the input of a 690 c.p.s. filter 44, for the harmonic. The output of the filter 44 is connected to a square and differentiate circuit 45 which produces sharp pulses indicating alternate zeros of the 690 c.p.s. wave; a similar circuit 47 produces a corresponding pulse approximately 20 times longer in duration from the 30 c.p.s. reference wave. The outputs of the two circuits 45 and 47 are connected to a pulse gate circuit 46 which produces at its output a pulse accurately indicating a zero of the 30 c.p.s. reference wave. The comparison of such pulses with the 30 c.p.s. range indicating wave to obtain the range indication is a known technique in VOR receivers.

The discriminator 43 should be of a type which produces at its output the dominant harmonic of the signal modulating the input signal and has a considerable degree of suppression of other components. A suitable discriminator has been described in the Proceedings of the I.E.E., vol. 112, No. 4, April 1965.

Figure 3:
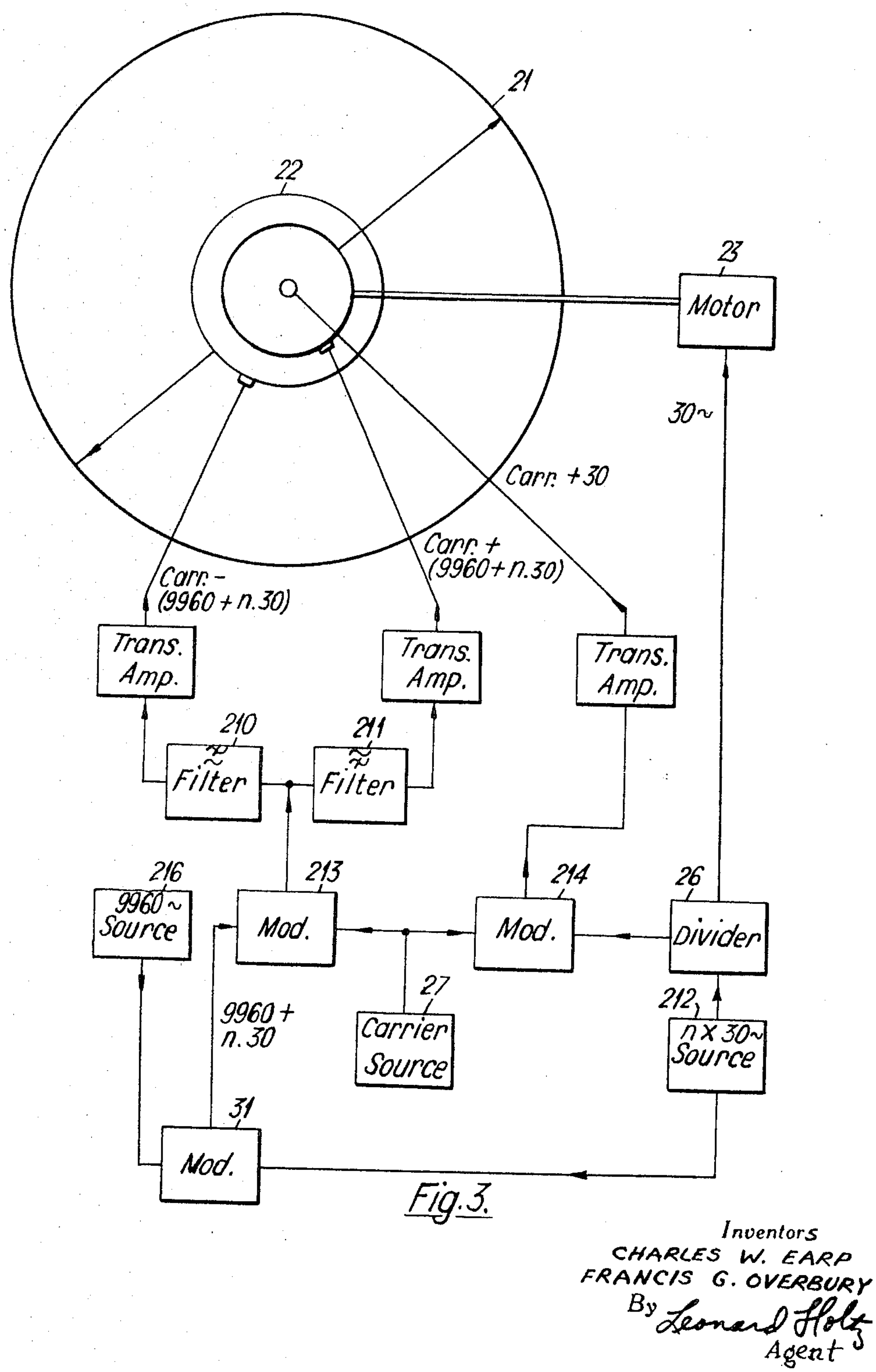
FIG. 3 shows a block circuit diagram of another type of beacon having any number of aerials.
Figure 5:
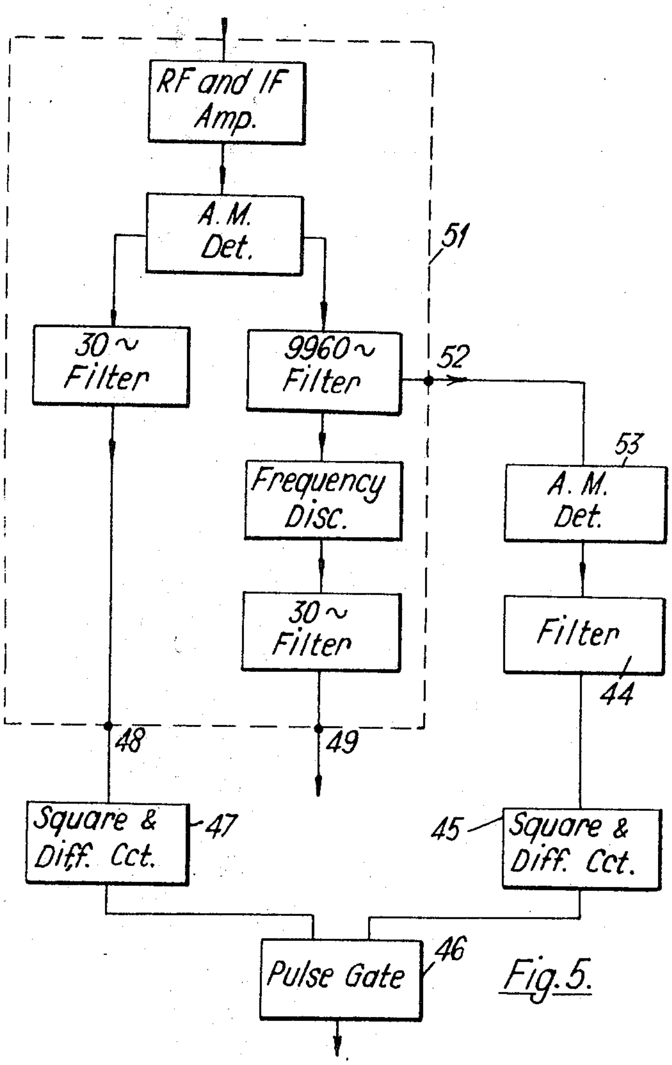
FIG. 5 shows a block circuit diagram of a receiver for use with the beacon shown in FIG. 3.

FIGS. 3 and 5 show the beacon and receiver block circuit diagrams of a further embodiment of the invention in which the harmonic of the reference frequency is transmitted as in phase amplitude modulation of the two sideband frequencies. The extra connection to the receiver from which the harmonic frequency is obtained is, in this embodiment, at the audio frequency stage instead of the IF stage.

Referring to FIG. 3 those blocks which are identical to those previously described in connection with FIG. 2 have the same reference numbers. The subcarrier frequency input (source 216) to an input of modulator 213 is obtained in this case from the output of modulator 31, the inputs of which are connected respectively to the output of the subcarrier signal source 216 and an output of the harmonic source 212. The beacon is a normal VOR beacon in which the additional modulator 31 is inserted between the source 216 and the modulator 213, the second input of the modulator 31 being the harmonic frequency of the reference wave obtained from the source 212.

Referring to FIG. 5 the receiver of the further embodiment shown within the block 51 is a normal VOR receiver and the blocks 44, 45, 46 and 47 are identical to those described with reference to FIG. 4. The input to the filter 44 is in this embodiment obtained from the output of an amplitude modulated detector 53 the input of which is a 9960 c.p.s. subcarrier output 52 obtained from the receiver 51.

The block circuits indicated herein are types of circuits well known in the art and need not be described further. The frequencies given in the embodiments are those which give compatibility with existing practice but are not essential to the invention. In those embodiments in which the harmonic of the reference wave is not dependent on the number of aerials any harmonic may be used, the choice being limited by the bandwidth of the receiver and the requirement that filtering the harmonic and the fundamental should be simple. It is also possible to use a signal containing multiple harmonics such as a pulse signal having a recurrence frequency equal to the gyration frequency.

Figure 6:
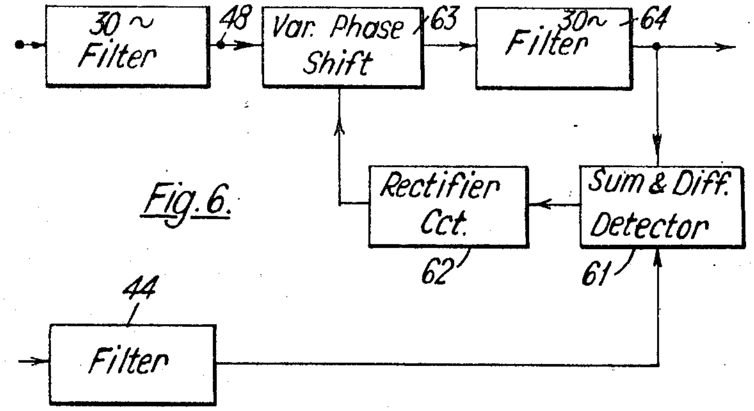
FIG. 6 shows an alternative circuit arrangement to part of that of FIGS. 4 and 5.

The embodiments hitherto described show a pulse type reference frequency output at the receiver. Sine wave outputs are a possible alternative and the block circuit diagram for sine wave operation is shown in FIGURE 6. The output 48 is the 30 c.p.s. reference signal and the filter 44 produces at its output the *n*'th harmonic of the reference signal. The output 48 is connected to a controllable phase shift circuit 63 which has its output connected via a 30 c.p.s. filter circuit 64 to one input of a sum and difference detector 61. The output of filter 44 is connected to the other input of the sum and difference detector 61, and the difference output of detector 61 is connected to a rectifier circuit 62. The output of the rectifier circuit 62 is connected to the control signal input of the phase shift circuit 63. The action of the control signal produced by rectification of the difference between the peaks of the reference signal and its harmonic shifts the phase of the reference signal to make the difference between the peaks zero, and so to correct the phase of the 30 c.p.s. reference signal. The corrected signal is then filtered by filter 64 and used in a normal VOR indicator.

Figure 7:
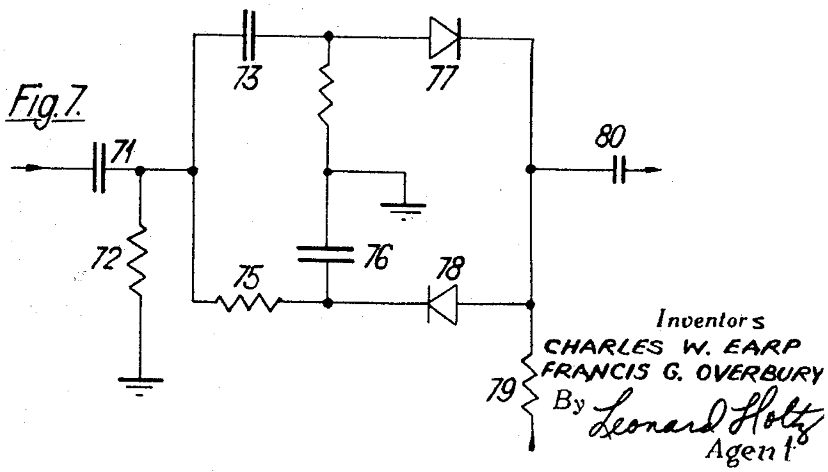
FIG. 7 shows a form of controllable phase-shift circuit for use in FIG. 6.

The details of a suitable phase shift circuit 63 are shown in FIG. 7. The input is fed via a blocking capacitor 71 and has a high impedance shunt to earth 72, the junction of 71 and 72 being connected to a +45° phase shift circuit 73, 74 and a —45° phase shift circuit 75, 76. The anode of a diode 77 is connected to the junction of 73, 74 and the cathode of a diode 78 is connected to the junction of 75, 76. The cathode of diode 77 and the anode of diode 78 are connected via a resistor 79 to the control signal input and via a blocking capacitor 80 to the output. The application of a positive signal produces a leading phase output and the application of a negative signal produces a lagging phase output.

The other block circuits shown in FIG. 6 are all known in the art, and alternative phase shift circuits for 63 are known and may be used.

It is to be understood that the foregoing description of specific examples of this invention is made by way of example only and is not to be considered as a limitation on its scope.

We claim:

1. A Doppler VOR system comprising:
a plurality of spaced aerials arranged in a circular array;
a separate aerial located at the center of said array;
means coupled to said array of aerials for causing signals to be radiated from the aerials in said array in sequence around said circle at a predetermined frequency of gyration;
means coupled to said separate aerial for causing a reference frequency signal having a frequency equal to said predetermined frequency to be radiated from said separate aerial;
said signals radiated from said array of aerials including at least one harmonic of said reference frequency signal;
said means coupled to said array of aerials including, means for generating a frequency which is a predetermined harmonic of said gyration frequency;
means for generating an upper and lower sideband of a carrier frequency;
means coupled to said generating means for modulating said sidebands with said predetermined harmonic frequency; and
first switching means for applying signals to successive aerials of said array going in one direction around said circle,
second switching means for applying signals to successive aerials of said array also going around said circle in the same direction but lagging the first switching by approximately 180°,
means for applying the modulated upper sideband signals to one of said switching means and the modulated lower sideband signals to the other of said switching means.

2. A Doppler system according to claim 1, further including a phase shifter and
means for applying the reference harmonic to the phase shifter to shift it by 180° before modulating one of the side bands.

3. A Doppler system according to claim 1 wherein the reference harmonic modulation on the upper and the lower sidebands are in phase.

4. A Doppler VOR system comprising:
a plurality of spaced aerials arranged in an array;
a separate aerial located for cooperation with said array;
means coupled to said array of aerials for causing signals to be radiated from aerials in said array in sequence at a predetermined frequency;
means coupled to said separate aerial for causing a reference frequency signal having a frequency equal to said predetermined frequency to be radiated from said separate aerial; said signals radiated from said array of aerials including at least one harmonic of said reference frequency signal; and
a receiver arranged to receive signals from said separate aerial and from said array of aerials;
means at said receiver for recovering and processing said reference signals; and
means coupled to said receiver to stablize said recovered reference signal.

5. A system according to claim 4 wherein said stabilizing means includes means to derive pulse type stable reference frequency output signals from said receiver.

6. A system according to claim 4 wherein said receiver further includes:
means coupled to said receiver to derive a stable sine wave reference frequency output signal therefrom;
a controllable phase shift circuit coupled to said means for receiving and processing the reference frequency; and
means coupling said sine wave deriving means to said controllable phase shift circuit for stabilizing said received and processed reference frequency.

References Cited

UNITED STATES PATENTS 3,262,117 7/1966 Stover.
3,287,727 11/1966 Earp.

FOREIGN PATENTS 1,003,317 9/1965 Great Britain.
1,190,525 4/1965 Germany.

RODNEY D. BENNETT, Jr., *Primary Examiner.*

R. E. BERGER, *Assistant Examiner.*